US008526407B2

(12) United States Patent
Zangi et al.

(10) Patent No.: US 8,526,407 B2
(45) Date of Patent: Sep. 3, 2013

(54) EXTENDED COORDINATED MULTIPOINT CELLS TO MITIGATE INTER-COMP-CELL DOWNLINK INTERFERENCE

(75) Inventors: Kambiz Zangi, Chapel Hill, NC (US); Jiann-Ching Guey, Cary, NC (US); Dennis Hui, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1062 days.

(21) Appl. No.: 12/465,864

(22) Filed: May 14, 2009

(65) Prior Publication Data

US 2010/0291936 A1    Nov. 18, 2010

(51) Int. Cl.
 *H04W 4/00* (2009.01)
(52) U.S. Cl.
 USPC ............................ 370/338; 370/310; 370/328
(58) Field of Classification Search
 None
 See application file for complete search history.

(56) References Cited

U.S. PATENT DOCUMENTS

| | | | |
|---|---|---|---|
| 2004/0141483 A1* | 7/2004 | Zeira et al. | 370/335 |
| 2007/0189234 A1* | 8/2007 | Heo et al. | 370/335 |
| 2007/0270155 A1* | 11/2007 | Nelson et al. | 455/452.2 |
| 2010/0042716 A1* | 2/2010 | Farajidana et al. | 709/224 |
| 2010/0261493 A1* | 10/2010 | Guey et al. | 455/501 |
| 2010/0290382 A1* | 11/2010 | Hui et al. | 370/312 |
| 2010/0317355 A1* | 12/2010 | Zangi et al. | 455/450 |

OTHER PUBLICATIONS

LG Electronics: "CoMP Configurations and UE/eNB Behaviors in LTE-advanced" 3GPP Draft: R1-090782, 3rd Generation Partnership Project (3GPP), Mobile Competence Centre; 650, Route Des Lucioles ; F-06921 Sophia-Antipolis Cedex; France, no. Athens, Greece: 20090203, Feb. 3, 2009.
LG Electronics: "Consideration on CoMP in LTE-Advanced" 3GPP Draft; R1-084203 LGE_Comp, 3rd Generation Partnership Project (3GPP), Mobile Competence Centre; 650, Route Des Lucioles ; F-06921 Sophia-Antipolis Ceder ; France, no. Prague, Czech Renublic; Nov. 5, 2008.
Huawei: "RAN2 considerations for coordinated multipoint transmission and reception" 3GPP Draft: R2-092178 RAN2 Considerations for Comp, 3rd Generation Partnership Project (3GPP), Mobile Competence Centre; 653, Route Des Lucioles ; F-06921 Sophia-Antipolis Cedex ; France, no. Seoul, Korea; 20090317, Mar. 17, 2009.

* cited by examiner

*Primary Examiner* — Hassan Phillips
*Assistant Examiner* — Gautam Sharma

(57) ABSTRACT

Inter-CoMP cell interference is reduced by "extending" at least one CoMP cell to include UEs served by a neighboring CoMP cell in the extended CoMP cell's transmission calculations, so as to minimize interference to the UEs served by other CoMP cells. Each UE in a border sub-cell identifies neighboring CoMP cells from which it receives interference in excess of a threshold value, and includes the interfering CoMP cells in a close-neighbor set. The close-neighbor set is transmitted to the UE's serving CoMP cell controller. When downlink transmissions are scheduled to the target UE, the controller notifies the neighboring CoMP cells in the close-neighbor set, identifying the target UE. Those CoMP cells then use information about the channel conditions from their transmit antennas to the target UE receive antennas to compute transmissions to UEs they serve, with the constraint that interference to the target UE is below a predetermined level.

22 Claims, 5 Drawing Sheets

EXTENDED COORDINATED MULTIPOINT CELLS TO MITIGATE INTER-COMP-CELL DOWNLINK INTERFERENCE

TECHNICAL FIELD

The present invention relates generally to wireless cellular communications, and in particular to a system and method of mitigating inter-cell interference by increasing the extent of Coordinated Multi-Point cells.

BACKGROUND

Wireless cellular communication networks are nearly ubiquitous, and provide mobile voice and data communications to millions of subscribers. In a cellular network, a fixed transceiver (base station, NodeB, etc.) provides two-way radio communications with a plurality of subscribers within a geographic area, or cell (as used herein, the term sector is synonymous with cell). Method of suppressing intra-cell radio interference, such as time-division, frequency-division, and code-division multiplexing, and combinations thereof, are known in the art. Additionally, methods of suppressing inter-cell interference, such as frequency reuse patterns, are known in the art. In modern wireless cellular communication networks, inter-cell interference remains the dominant source of performance impairment, restricting data rates, system capacity, and the quality of delivered communication services.

Coordinated Multi-Point (CoMP) transmission is a technology to minimize inter-cell interference. A plurality of geographically contiguous cells—referred to as sub-cells—are grouped together to form a CoMP cell. Each CoMP cell has a central controller that coordinates transmission within its constituent sub-cells so as to minimize inter-cell interference within the CoMP cell (referred to herein as inter-sub-cell interference, or intra-CoMP cell interference). The CoMP cell controller minimizes inter-sub-cell interference by coordinating scheduling of transmissions to user equipment (UE) within the cells, and/or actively suppressing interference using signal processing techniques.

Although the CoMP system can be effective in minimizing intra-CoMP cell interference, the inter-CoMP cell interference still exists along the joined areas between neighboring CoMP cells.

SUMMARY

According to one or more embodiments described and claimed herein, inter-CoMP cell interference is reduced by "extending" at least one CoMP cell to include one or more UEs served by a neighboring CoMP cell in the extended CoMP cell's transmission calculation, so as to minimize interference to the UEs served by other CoMP cells. Each UE in a border sub-cell identifies neighboring CoMP cells from which it receives interference in excess of a threshold value, and includes the interfering CoMP cells in a close-neighbor set. The close-neighbor set is transmitted to the UE's serving CoMP cell controller. When downlink transmissions are scheduled to the target UE, the controller notifies the neighboring CoMP cells in the close-neighbor set, identifying the target UE. The neighboring CoMP cells then use information about the channel conditions from their transmit antennas to the target UE receive antennas, and construct the transmissions to UEs they serve, with the constraint that interference to the target UE is below a predetermined level. This process occurs reciprocally among all CoMP cells in a network.

One embodiment relates to a method of mitigating inter-CoMP cell interference by a CoMP cell controller managing transmissions in a plurality of sub-cells comprising a first CoMP cell. Information is received, from a controller of a second, neighboring CoMP cell, identifying a UE in a border sub-cell of the second CoMP cell scheduled to receive transmissions from the second CoMP cell, which UE also receives interference from antennas of the first CoMP cell. Using the information about the downlink channel to the UE in the border sub-cell of the second CoMP cell, transmissions are constructed to UEs in the first CoMP cell to maximize data rates received by the UEs in the first CoMP cell, subject to the constraint that interference experienced by the UE in the border sub-cell of the second CoMP cell, due to the constructed transmissions in the first CoMP cell, is below a predetermined level.

DETAILED DESCRIPTION

Figure 1:
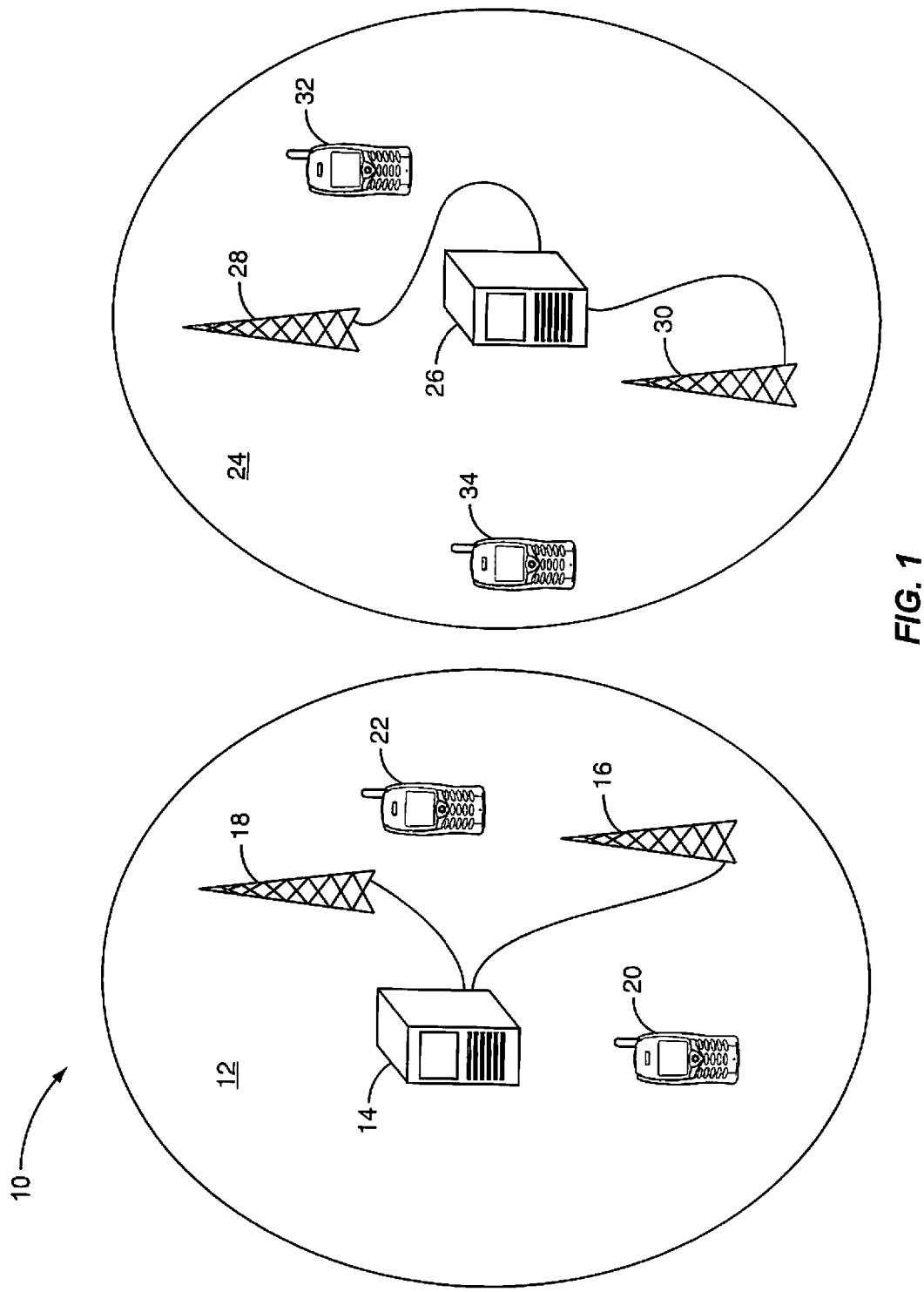
FIG. 1 is a functional diagram of a wireless communication network comprising two Coordinated Multipoint (CoMP) cells.

FIG. 1 depicts a network 10 divided into two neighboring CoMP cells 12, 24, of which only portions of each are depicted. A first CoMP cell 12 includes a controller 14 and fixed transceivers located, e.g., at base stations 16, 18. The base stations 16, 18 (each of which may comprise a sub-cell) transmit downlink signals to User Equipment 20, 22 located in the CoMP cell 12. As known in the art, controller 14 applies signal processing techniques, such as frequency-dependent beamforming, to construct the signal transmitted to UE 22, where this signal is transmitted by the transceivers located at base stations 16 and 18. The signal transmitted to UE 22 is constructed to maximize the data rate to targeted UE 22 while simultaneously keeping the interference caused to other UEs in the CoMP cell 12 below a certain threshold, thus reducing intra-CoMP-cell interference. The transmission to UE 20 in CoMP cell 12 is constructed analogously to maximize the data rate received by UE 20 while simultaneously keeping the interference caused to other UEs in CoMP cell 12 below a certain threshold.

A second CoMP cell 24 includes a controller 26 and fixed transceivers located, e.g., at base stations 28, 30. The base stations 28, 30 transmit weighted downlink signals to UEs 32, 34 while keeping the interference to UEs in the CoMP cell 24 below a certain threshold. Note that UE 34 is proximate to CoMP cell 12, and in particular is proximate to the UE 22 in the CoMP cell 12. If the controller 14 of the CoMP cell 12 schedules transmissions to the UE 22 at the same time the controller 26 schedules transmissions to the UE 34 in CoMP cell 24, the UE 34 will experience significant interference from the CoMP cell 12 transmissions to the UE 22, since the controller 14 is unaware of the UE 32, and cannot construct the transmissions at the base stations 16, 18 to mitigate interference the interference experienced by UE 32. Similarly, transmissions scheduled to the UE 34 by the controller 26 will cause significant interference to the UE 22.

Figure 2:
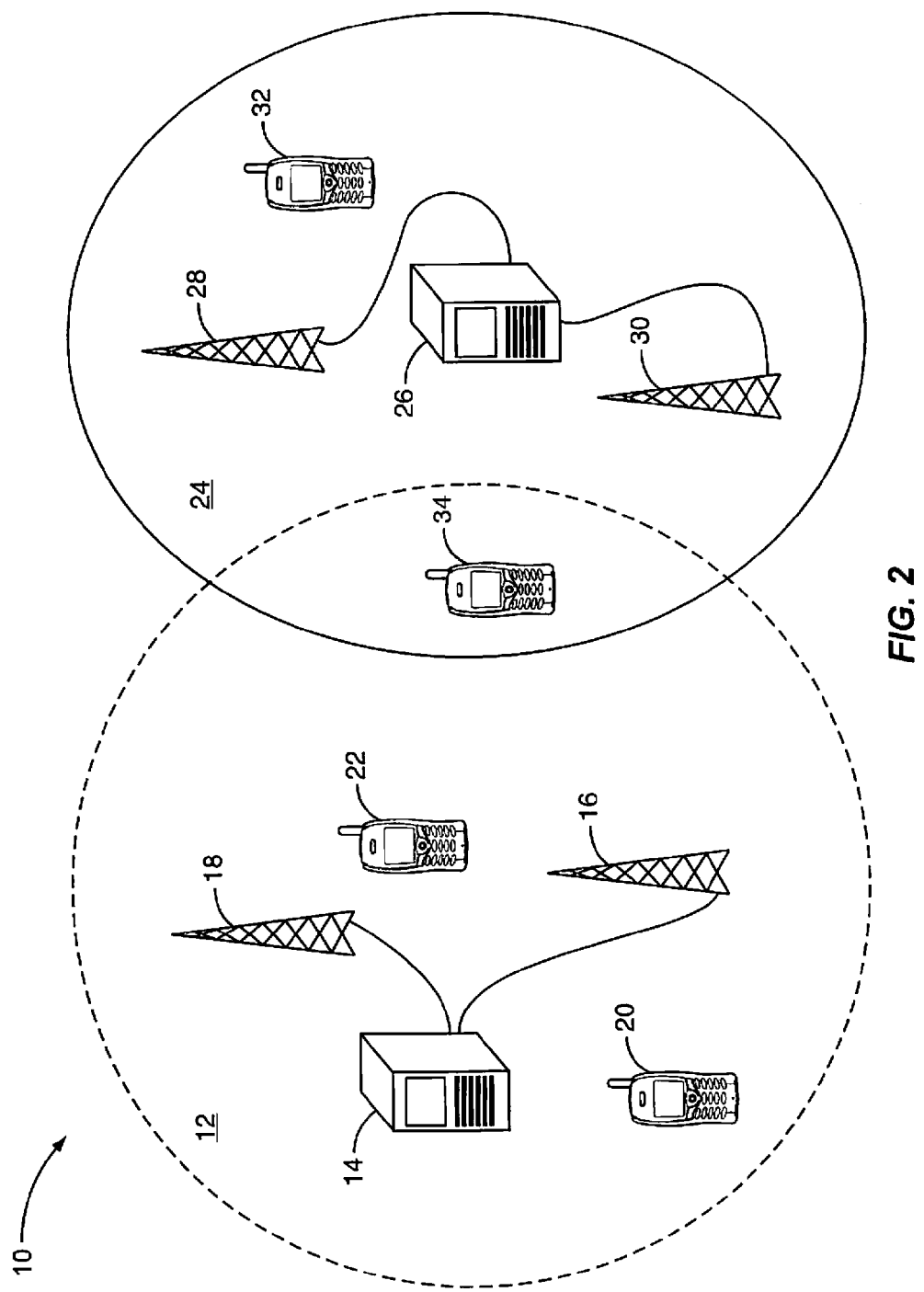
FIG. 2 is a functional diagram of the network of FIG. 1 wherein one CoMP cell is functionally extended to include a User Equipment in another CoMP cell.

According to one embodiment of the present invention, the CoMP cell 12 is "extended" to include the UE 34, as depicted in FIG. 2, at least for the purpose of interference suppression. By including the UE 34 in its calculation for determining the transmissions to UEs in CoMP cell 12, controller 14 may utilize known signal processing techniques, such as frequency-dependent beamforming, to maximize the data rate to targeted UEs 20 and 22, while simultaneously suppressing interference caused to UE 34, as well as possibly other UEs (not shown) in the CoMP cell 12. In this manner, inter-CoMP cell interference to UE 34, from CoMP cell 12, may be minimized. This idea may be expanded to each UE 22, 34 in a border sub-cell that may experience interference from transmissions in a neighboring CoMP cell 24, 12, as further explained herein.

The first step is to identify the UEs for which inter-CoMP cell interference is significant enough to warrant active mitigation. The UEs may most efficiently perform this analysis, and transmit their results to their respective CoMP cell controllers. Each UE (or at least, each UE in a border sub-cell) maintains a list of neighboring CoMP cells, and performs measurements of the path loss from each of the antennas belonging to each of its neighboring CoMP cells. For a neighboring CoMP cell "k," the UE determines the minimum path loss to the antennas belonging to CoMP cell "k." This minimum path loss is denoted by $g\_\{k\}$. By convention, $g\_\{0\}$ denotes the minimum path loss to the CoMP cell that is serving this UE. A threshold value T is defined (in units of dB), such that a UE will be considered for intra-CoMP cell interference mitigation if there is at least one "k" greater than zero where $$10*\log_{10}\left(\frac{g\_\{k\}}{g\_\{0\}}\right) > T. \qquad (1)$$

The set of CoMP cells, i.e., the values of the index k, for which Eq. (1) is true, is referred to as the "close-neighbor set" for this UE. As an example, T=−3 dB would indicate that a UE will be considered for intra-CoMP cell interference mitigation if it measures a path loss to at least one non-serving CoMP cell that is within 3 dB of the path loss to its serving CoMP cell. The UE periodically transmits its close-neighbor set to its serving CoMP cell.

Each CoMP cell independently determines the subset of its UEs to which transmissions are scheduled in an upcoming predefined transmission duration, such as a frame, sub-frame, Transmission Time Interval (TTI), TMDA time slot, or the like. Of these, each CoMP cell then identifies the subset of its scheduled UEs that have a non-empty close-neighbor set—that is, the scheduled UEs in border sub-cells likely to experience interference from transmissions that may be scheduled in neighboring CoMP cells. The CoMP cell controller then transmits an identification of these scheduled UEs with non-empty close-neighbor sets to the relevant neighbor UEs, and receives similar identifications of UEs from the controllers of all neighboring CoMP cells.

For example, with reference to FIG. 2, the controller 26 of CoMP cell 24 determines that downlink transmissions will be scheduled, in a upcoming frame, to UEs 32 and 34 (and likely other UEs not shown and omitted from this discussion). Of these, only UE 34 reports a non-empty close-neighbor set to the controller 26. Accordingly, the controller 26 transmits to the controller 14 of CoMP cell 12, information identifying UE 34 and indicating that it is scheduled to receive downlink transmissions from CoMP cell 24 in an upcoming frame.

Figure 3:
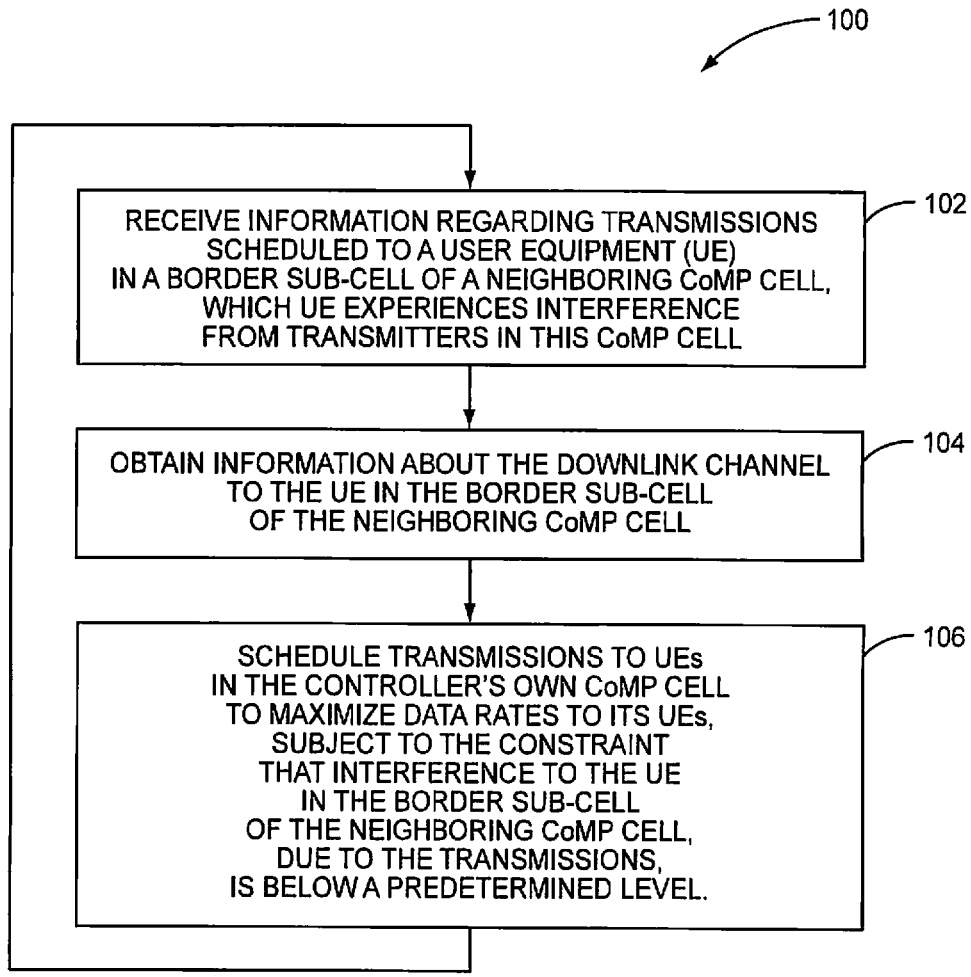
FIG. 3 is a flow diagram of a method of interference reduction.

A method 100 of mitigating inter-CoMP cell interference by CoMP cell 12 is described with reference to FIG. 3. As described above, the controller 14 receives from CoMP cell 24 information identifying a UE 34 in a border sub-cell of a neighboring CoMP cell 24 scheduled to receive transmissions from the second CoMP cell 24, which UE 34 also receives interference from antennas of the CoMP cell 12 (block 102).

To minimize interference to UE 34, the controller 14 of CoMP cell 12 must have some information regarding the downlink channel from its transmit antennas to the receive antenna(s) of UE 34. In one embodiment, with Time Division Duplexing (TDD) and assuming uplink-downlink channel reciprocity, this information can be obtained by transceivers in CoMP cell 12 receiving and analyzing the reference signals, also known as pilot signals, transmitted by UE 34. In another embodiment, the controller 26 may direct the UE 34 to analyze reference symbols from CoMP cell 12 antennas and report channel conditions, which the controller 26 includes in the information it transmits to the controller 14 of CoMP cell 12. In yet another embodiment, the UE 34 may report channel quality metrics directly to the controller 14, via base stations 16 and 18. In general, the controller 14 of the CoMP cell 12 may ascertain or estimate channel conditions between its transmit antennas and receive antennas of the UE 34 (block 104) in any manner, and based on any available information.

The controller 14 of CoMP cell 12—armed with knowledge that downlink transmissions are scheduled to UE 34, that the UE 34 sees interference from antennas in CoMP cell 12, and information regarding the channel conditions from its transmitters to the UE 34 receiver—may include UE 34 in its global optimization for calculating what is transmitted from its antennas 16 and 18 to keep interference to UE 34 below a certain level. In particular, the controller 14 may construct transmissions to UEs 20 such that data rate to UEs 20 is maximized, subject to the constraint that interference to other UEs in CoMP cell 12 (e.g. UE 22) and to UE 34, due to these transmissions, is below a predetermined level (block 106). In this manner, the CoMP cell 12 has "expanded" its coverage, at least in the sense that it includes a UE 34 served by a different CoMP cell 24 in its transmission construction. The method 100 repeats for every UE in CoMP cell 12, and for every predetermined transmission duration (e.g., frame).

One algorithm for forming the weighted transmissions is the epsilon-forcing algorithm described by Kambiz Zangi, Dennis Hui, and Leonid Krasny, in U.S. patent application Ser. No. 12/404,773, titled, "System and Method for Coordinated Multipoint Downlink Transmissions," filed on Mar. 16, 2009, assigned to the assignee of the present application, and incorporated herein by reference in its entirety. Other suitable methods are also known to those of skill in the art. Note that the interference suppression to UE 34 by CoMP cell 12 does not require the CoMP cell 12 controller 14 to have any knowledge of the data transmitted to UE 34 by CoMP cell 24 (e.g., data rate, modulation, etc.). In fact, a significant advantage of embodiments of the present invention is the small quantum of data that needs to be transmitted between CoMP cell controllers 14, 26—basically, only the ID of affected UEs to which transmissions are scheduled, and in some cases, some channel information.

Although the embodiment discussed above has been explained with reference to CoMP cell 12 minimizing interference to a UE 34 served by CoMP cell 24, in reality all CoMP cells 12, 24 in a network 10 will simultaneously minimize interference to all neighboring CoMP cell UEs which experience significant inter-CoMP-cell interference. For example, when the controller 26 transmits information to the controller 14 identifying UE 34 as a scheduled downlink recipient that has reported significant signal strength from CoMP cell 12 antennas, the controller 14 contemporaneously transmits to controller 26 corresponding information regarding, e.g., UE 22. The controller 26 will then ascertain or estimate channel conditions from its transmit antennas to the UE 22 receiver antenna, and during the next downlink frame, will transmit signals from CoMP cell 24 antennas so as to minimize interference caused to UE 22.

Figure 5:
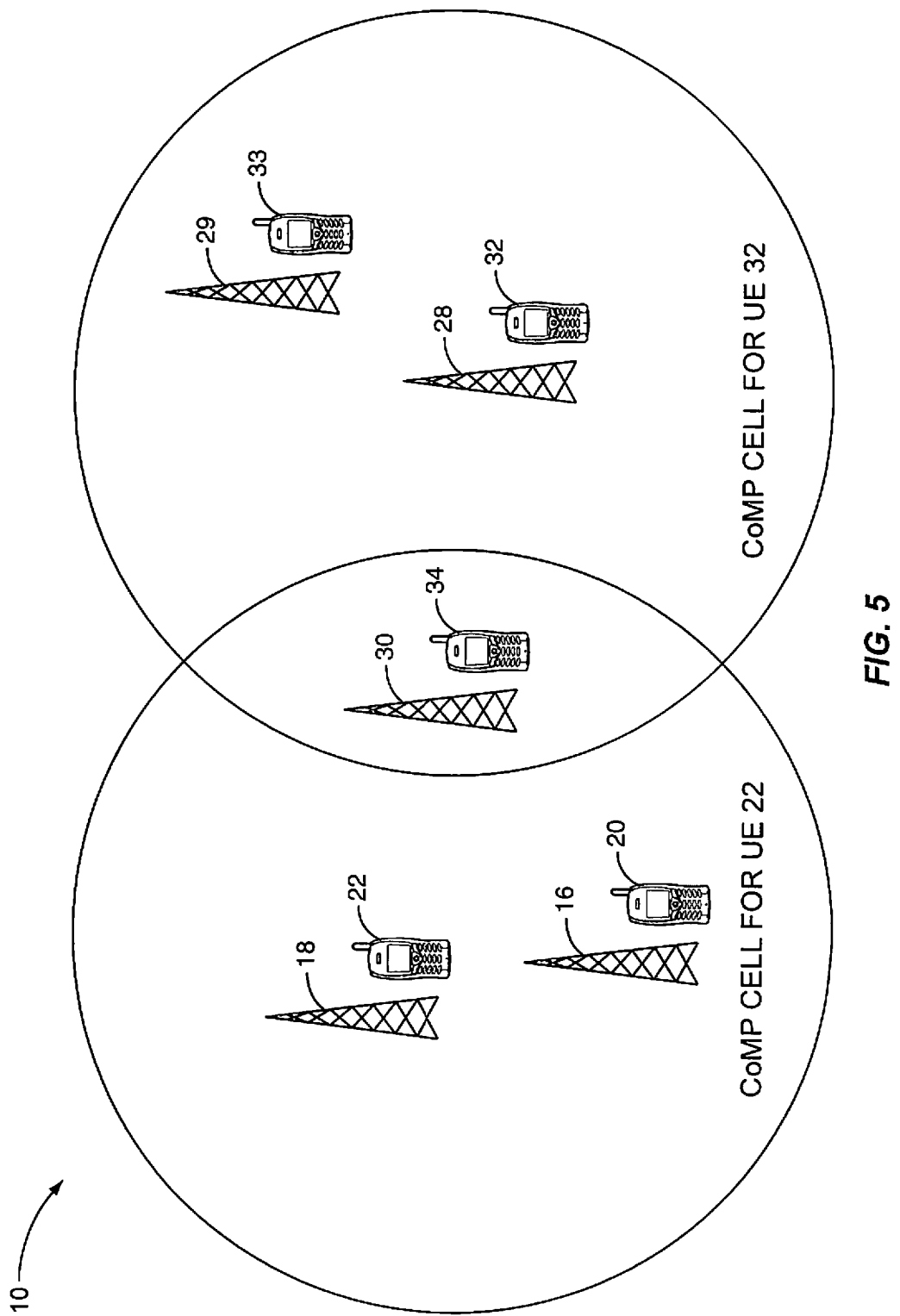
FIG. 5 is a functional diagram of the network of FIG. 1 where in the two CoMP cells are dynamically defined, and overlap in terms of UEs and base stations.

In embodiments of the present invention, the "expansion" of CoMP cell borders—at least for the purpose of interference mitigation—is UE-centric, since the identification of potentially interfering close-neighbor sets is performed by the UEs. FIG. 5 depicts an embodiment of the present invention in which each UE defines own CoMP cell. That is, each UE defines the set of base stations that transmit downlink signals to it.

In FIG. 5, a dynamic CoMP cell for UE 22 comprises the base stations 16, 18, and 30, with an appropriately programmed processor at the base station 18 acting as the controller for this dynamic CoMP cell. Similarly, a dynamic CoMP cell for UE 32 comprises the base stations 28, 29, and 30, with the base station 28 serving as the CoMP cell controller. Note that base station 30 belongs to both the CoMP cell for UE 22 and the CoMP cell for UE 32. Base station 16 is the serving base station for UE 20; base station 18 is the serving base station for UE 22; base station 30 is the serving base station for UE 34; base station 28 is the serving base station for UE 32; and base station 29 is serving base station for UE 33. The downlink transmissions to UE 22 are transmitted from base stations 16, 18, and 30, and these transmissions would normally cause significant interference to the UE 32, which is served by base station 28. Note that base station 28 does not belong to the CoMP cell of UE 22.

According to this embodiment, the transmissions to UE 22, emanating from base stations 16, 18, and 30, are constructed in such a way to maximize the data rate received by UE 22 while simultaneously keeping the interference caused to UE 32 below a certain level. As described above, the base station 28 (or other CoMP cell controller for the UE 32 dynamic CoMP cell) must transmit to the controller of the dynamic CoMP cell for UE 22 (e.g., base station 18), that the base stations 16, 18, and 30 are in its close-neighbor set, and that downlink transmissions are scheduled to UE 32 during an upcoming transmission duration. Those of skill in the art will readily recognize that transmissions to UE 32, emanating from base stations 28, 29, and 30, can be constructed analogously to maximize the data rate received by user 32 while simultaneously keeping the interference caused to UE 22 below a certain level.

Figure 4:
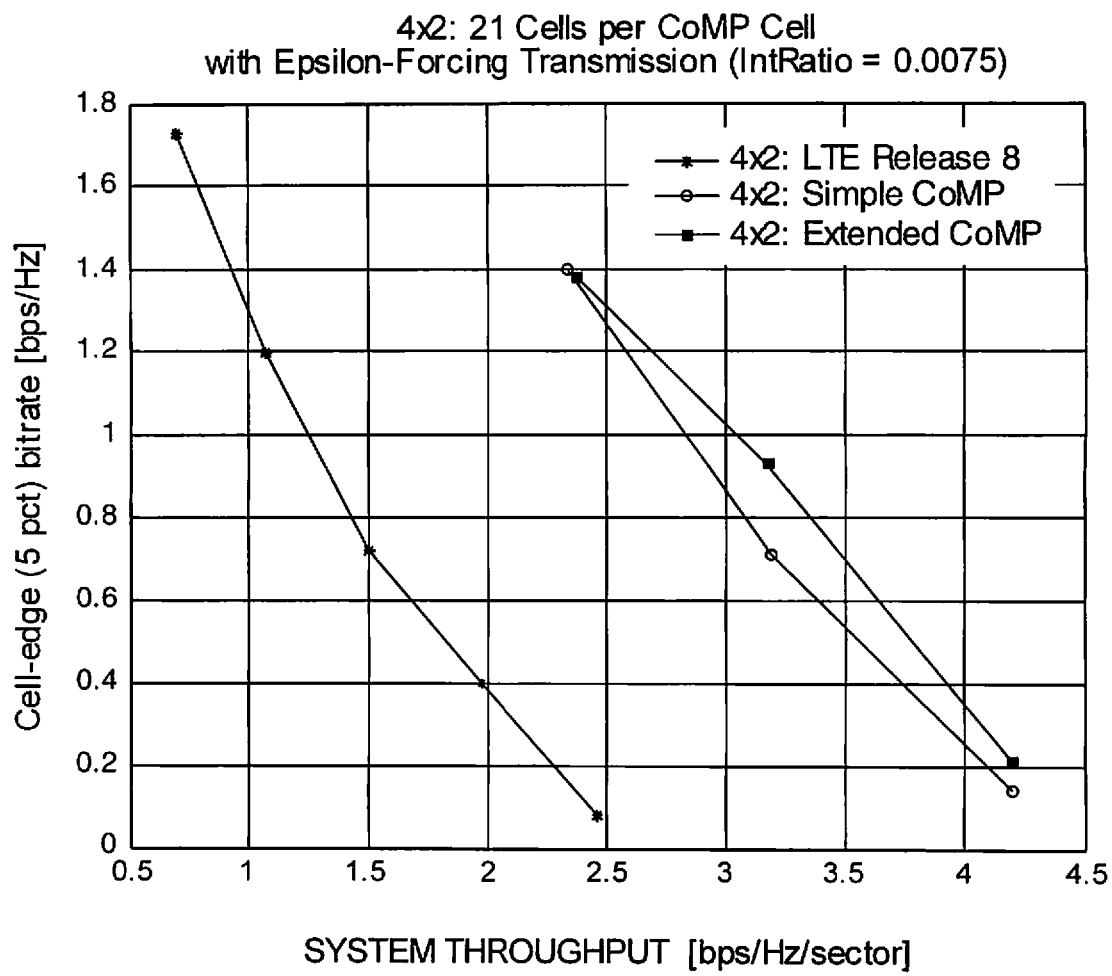
FIG. 4 is a graph of simulated intra-CoMP cell interference.

FIG. 4 graphs the results of system-level simulations comparing a simple CoMP system to an extended CoMP system according to embodiments of the present invention. Each CoMP cell comprises of sub-cells, and the threshold T=−3 dB. The simulated system has four transmit antennas per base station and two receive antennas per UE. As FIG. 4 depicts, the extended CoMP system increased the bit rate in border sub-cells about 50% compared to the simple CoMP system, for the same system throughput.

According to embodiments of the present invention, inter-CoMP cell interference is reduced, with very low-bandwidth communication required between neighboring CoMP cells. In some embodiments, only an identification of a CoMP cell's own UEs to which downlink transmissions are scheduled, and which identified a target CoMP cell in its close-neighbor set, need be transmitted from one CoMP controller to another. In other embodiments, some channel condition information may also be shared between CoMP cell controllers.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of mitigating interference between Coordinated Multi-Point (CoMP) cells by a first CoMP cell controller managing transmissions in a plurality of sub-cells comprising a first CoMP cell, comprising:
   receiving, from a second CoMP cell controller managing transmissions in a second, neighboring CoMP cell, information identifying a User Equipment (UE) in the second CoMP cell scheduled to receive transmissions from the second CoMP cell during a predetermined transmission duration, the UE in the second CoMP cell also receiving interference from one or more antennas of the first CoMP cell, wherein the UE in the second CoMP cell is in a border sub-cell of the second CoMP cell, wherein such border sub-cell borders the first CoMP cell;
   obtaining information about the downlink channel to the UE in the second CoMP cell; and
   scheduling transmissions, prior to the commencement of the predetermined transmission duration, to a plurality of UEs in the first CoMP cell to maximize data rates, subject to the constraint that interference to the UE in the second CoMP cell, due to the transmissions, is below a predetermined level.

2. The method of claim 1 wherein obtaining information about the downlink channel to the UE in the second CoMP cell comprises monitoring reference signals transmitted by the UE in the second CoMP cell.

3. The method of claim 1 wherein scheduling transmissions to a plurality of UEs in the first CoMP cell, so as to restrain interference to the UE in the second CoMP cell to be below a predetermined level, comprises weighting the transmissions according to an epsilon-forcing algorithm.

4. The method of claim 1 wherein the first CoMP cell is dynamically determined, and comprises only sub-cells transmitting downlink signals to a first UE in the first CoMP cell.

5. The method of claim 4 wherein a base station in a sub-cell serving the first UE is the first CoMP cell controller.

6. The method of claim 1 further comprising:
   identifying at least one UE in the first CoMP cell that experiences interference from a third CoMP cell; and
   transmitting to the controller of the third CoMP cell, downlink scheduling information regarding the at least one interfered UE.

7. The method of claim 6 wherein the second and third CoMP cells are the same.

8. The method of claim 6 wherein identifying at least one UE in the first CoMP cell that experiences interference from a third CoMP cell comprises receiving an indication from the interfered UE in the first CoMP cell that the minimum path loss to an antenna of the third CoMP cell is within a predetermined amount of the path loss to it serving antenna.

9. The method of claim 8 wherein the interfered UE sends the indication if $$10 * \log_{10}\left(\frac{g\_\{k\}}{g\_\{0\}}\right) > T$$

where k is an index identifying a neighboring CoMP cell;
g_{k} is the minimum path loss to an antenna belonging to CoMP cell k;
g_{0} is the minimum path loss to the serving CoMP cell; and
T is a predetermined threshold value in dB.

10. A method of mitigating interference between Coordinated Multi-Point (CoMP) cells by a first CoMP cell controller managing transmissions in a plurality of sub-cells comprising a first CoMP cell, comprising:
collecting at the first CoMP cell controller, an indication from a UE served by the first CoMP cell that the UE receives interference from a transmitter in a second CoMP cell, wherein the UE in the first CoMP cell is in a border sub-cell of the first CoMP cell, wherein such border sub-cell borders the second CoMP cell;
scheduling by the first CoMP cell controller, downlink transmissions to the UE in a future predetermined transmission duration; and
prior to the commencement of the predetermined transmission duration, transmitting to the a second CoMP cell controller managing transmissions in a plurality of sub-cells comprising the second CoMP cell, an identification of the UE and an indication that downlink transmissions are scheduled to the UE and that the UE receives interference from the second CoMP cell.

11. The method of claim 10 wherein the indication from a UE served by the first CoMP cell that the UE receives interference from a transmitter in the second CoMP cell comprises an indication from the UE that the minimum path loss to an antenna of the second CoMP cell is within a predetermined amount of the path loss to it serving antenna.

12. The method of claim 11 wherein the UE sends the indication if $$10 * \log_{10}\left(\frac{g\_\{k\}}{g\_\{0\}}\right) > T$$

where k is an index identifying a neighboring CoMP cell;
g_{k} is the minimum path loss to an antenna belonging to CoMP cell k;
g_{0} is the minimum path loss to the serving CoMP cell; and
T is a predetermined threshold value in dB.

13. The method of claim 10 wherein the first CoMP cell is dynamically determined, and comprises only sub-cells transmitting downlink signals to the UE in the first CoMP cell.

14. The method of claim 13 wherein a base station in a sub-cell serving the UE in the first CoMP cell is the first CoMP cell controller.

15. The method of claim 10 further comprising:
receiving from the second CoMP cell controller, prior to the commencement of the predetermined transmission duration, information identifying a UE in the second CoMP cell scheduled to receive transmissions from the second CoMP cell, the UE in the second CoMP cell having indicated to the second CoMP cell controller that it receives interference from the first CoMP cell;
obtaining information about the downlink channel to the UE in the second CoMP cell; and
scheduling transmissions to a plurality of UEs in the first CoMP cell to maximize data rates, subject to the constraint that interference to the UE in the second CoMP cell, due to the transmissions, is below a predetermined level.

16. The method of claim 15 wherein obtaining information about the downlink channel to the UE in the second CoMP cell comprises monitoring reference signals transmitted by the UE in the second CoMP cell.

17. The method of claim 15 wherein scheduling transmissions to UEs in the first CoMP cell, so as to restrain interference to the UE in the second CoMP cell to be below a predetermined level, comprises weighting the transmissions according to an epsilon-forcing algorithm.

18. A Coordinated Multi-Point (CoMP) cell controller communicatively linked to a plurality of network transceivers, each transceiver providing radio communications to User Equipment (UE) in a sub-cell of a first CoMP cell, comprising:
a first communication interface to one or more controllers of neighboring CoMP cells, the controller operative to receive over the first communication interface, identification of one or more UEs served by the neighboring CoMP cells, the UEs being scheduled for downlink transmissions from their respective CoMP cells and receiving interference from the first CoMP cell, wherein the UEs are in border sub-cells of the first CoMP cell, wherein such border sub-cells border the CoMP cell of the respective UE; and
a scheduler operative to schedule downlink transmissions to one or more of UEs in the first CoMP cell so as to maximize data rates, subject to the constraint that interference to the identified UEs in the neighboring CoMP cells, caused by the transmissions, is below a predetermined level.

19. The CoMP cell controller of claim 18, further comprising:
a second communication interface to the network transceivers in the first CoMP cell, the controller operative to transmit over the second communication interface, to the network transceivers, transmissions weights to UEs served by the first CoMP cell;
wherein the controller is further operative to receive over the second communication interface, from the network transceivers, close-neighbor sets transmitted by UEs in the first CoMP cell, the close-neighbor sets identifying neighboring CoMP cells causing interference to the UEs above a predetermined threshold.

20. The CoMP cell controller of claim 19 wherein the controller is further operative to transmit, over the first communication interface, to the controllers of one or more neighboring CoMP cells, for each UE having a non-zero close-neighbor set and to which it has scheduled downlink transmissions, an identification of UE.

21. The CoMP cell controller of claim 19, wherein the controller is further operative to transmit, to the CoMP cells in the close-neighbor set, channel condition information measured by the associated UE.

22. The CoMP cell controller of claim 19, wherein the CoMP cell controller is associated with a first transceiver in a sub-cell of the first CoMP cell serving a first UE, and the first CoMP cell is dynamically defined as comprising the sub-cells transmitting downlink signals to the first UE in the first CoMP cell.

* * * * *